United States Patent [19]

Sale et al.

[11] Patent Number: 4,724,079
[45] Date of Patent: Feb. 9, 1988

[54] WATER PURIFICATION PROCESS

[75] Inventors: Gloria S. Sale, 1630 Barak La., Bryan, Tex. 77802; Harry J. Darr, Bryan; William L. Hoover, College Station, both of Tex.

[73] Assignee: Gloria Stephan Sale

[21] Appl. No.: 690,758

[22] Filed: Jan. 11, 1985

[51] Int. Cl.⁴ ............................................. C02F 9/00
[52] U.S. Cl. .................................. 210/638; 210/652; 210/668; 210/754; 210/764
[58] Field of Search .............. 210/638, 650–655, 210/663, 668, 694, 754, 764, 806, 263, 266, 282, 900

[56] References Cited

U.S. PATENT DOCUMENTS

| | | | |
|---|---|---|---|
| 2,420,419 | 5/1947 | Dudley | 210/24 |
| 2,468,471 | 4/1949 | Thursion | 210/24 |
| 3,327,859 | 6/1967 | Pall | 210/266 |
| 3,357,563 | 12/1967 | Sicard | 210/209 |
| 3,375,933 | 4/1968 | Rodman | 210/502 |
| 3,400,074 | 9/1968 | Grenci | 210/23 |
| 3,469,696 | 9/1969 | Petrucci et al. | 216/97 |
| 3,562,152 | 2/1971 | Davison | 210/22 |
| 3,625,883 | 12/1971 | Valdespino | 210/10 |
| 3,705,651 | 12/1972 | Klein | 210/266 |
| 3,846,295 | 11/1974 | Gibbs | 210/23 |
| 3,870,033 | 3/1975 | Faylor et al. | 210/900 |
| 4,016,080 | 4/1977 | Williams | 210/284 |
| 4,145,279 | 3/1979 | Selby, III | 210/17 |
| 4,156,645 | 5/1979 | Bray | 210/23 |
| 4,160,727 | 7/1979 | Harris, Jr. | 210/23 |
| 4,169,789 | 10/1979 | Lerat | 210/22 |
| 4,177,142 | 12/1979 | Halbfoster | 210/75 |
| 4,200,526 | 4/1980 | Johnson | 210/23 |
| 4,276,177 | 6/1981 | Smith | 210/650 |
| 4,349,442 | 9/1982 | Barraque et al. | 210/675 |
| 4,358,376 | 11/1982 | Moriuchi et al. | 210/282 |
| 4,430,226 | 2/1984 | Hegde et al. | 210/638 |
| 4,434,057 | 2/1984 | Marquardt | 210/638 |
| 4,482,459 | 11/1984 | Shiver | 210/694 |

*Primary Examiner*—Ivars Cintins
*Attorney, Agent, or Firm*—Richards, Harris, Medlock & Andrews

[57] ABSTRACT

A method for purifying source water to obtain sterile, low-sodium water is described. The improved method employs ion-exchange, adsorption, filtration by particulate size, ultrafiltration, and reverse osmosis in combination with a closed holding system requiring only 2-3 ppm chlorine for sterilization. A method for storing treated water sterilized with chlorine, keeping the chlorine uniformly distributed during storage, and for removing the chlorine just prior to using the water while maintaining sterility of the water is also disclosed. An additional aspect of the invention is novel sterile filtration means, disclosed for removing chlorine from treated water, comprising a receptacle for activated carbon particles, having a water inlet and a water outlet, yet which is sealed from contamination from airborne microbes, and an effective number of carbon particles. The novel filtration means is wholly autoclavable.

17 Claims, 2 Drawing Figures

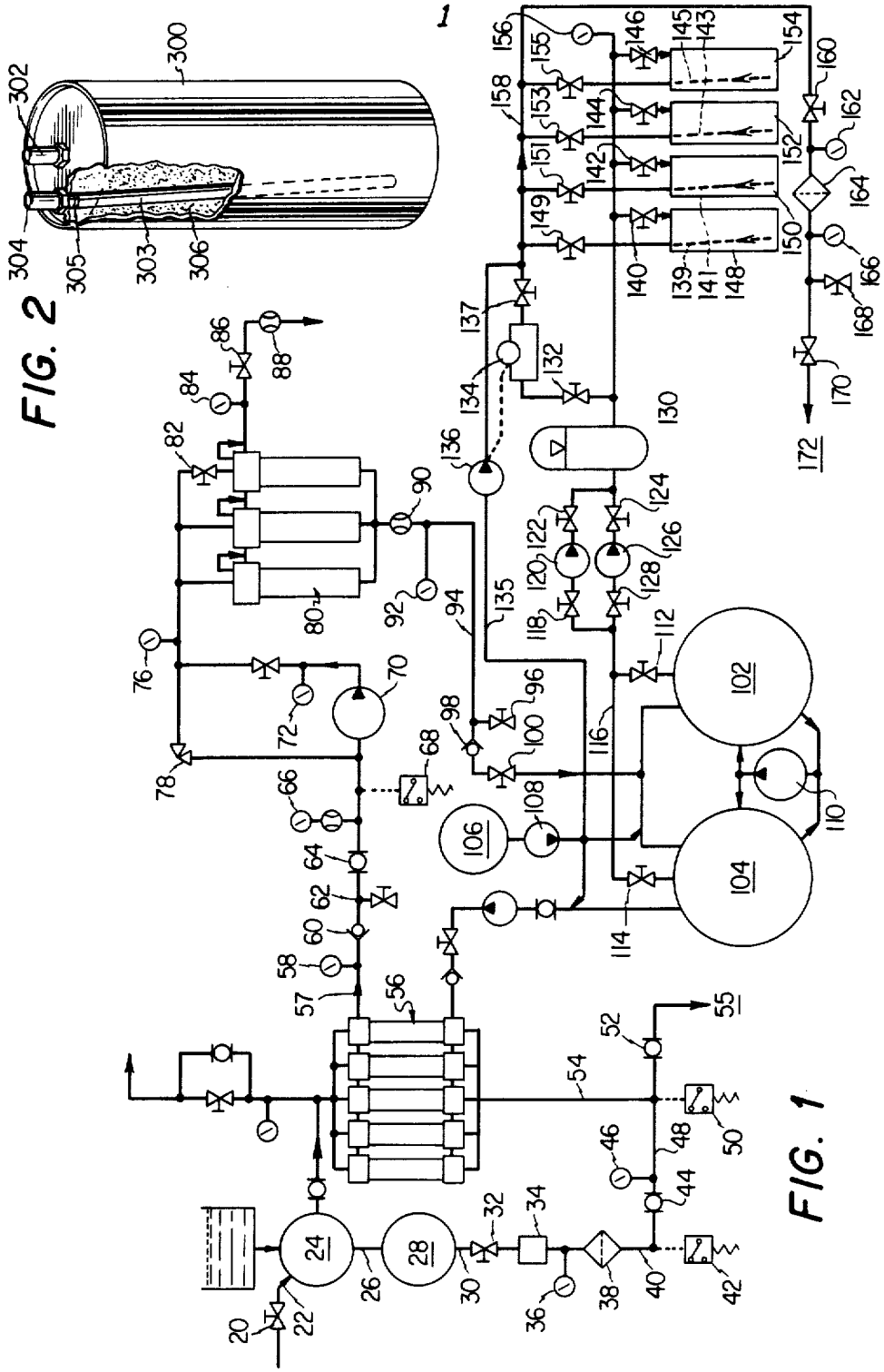

WATER PURIFICATION PROCESS

TECHNICAL FIELD

This invention relates to the water purification field. More specifically, this invention concerns a purification process effective for removing undesirable components from ground water or municipal water and for achieving low-sodium, low-particulate, sterile water suitable for the manufacture of food and beverage items. Specifically, the water obtained by this process is suitable for the bottling of beverages, for example drinking water and carbonated beverages.

BACKGROUND OF THE INVENTION

Past methods for obtaining water suitable for use in making soft drinks have employed a series of cumbersome procedures requiring large working areas and open systems highly susceptible to contamination and, hence, a need to add large amounts of chlorine to insure sterility of the water prior to the use of the treated water in bottling, for example, soft drinks. Distillation methods are a known alternative but are economically prohibitive for some large scale operations.

Most source water (including ground water or municipal water) contains amounts of salts such as sodium, calcium, magnesium and iron along with carbonates and particulate matter which make the source water unsuitable for use in bottling pure water or soft drinks. Of particular concern to the bottlers of soft drinks is the higher-than-desired content of carbonates in ground water obtained from municipal water supplies. The makers of soft drinks also require that the treated water be sterile to insure continued sterility of the soft drink product. Concentrated syrups used to make soft drinks contain a high concentration of sugar which would serve as an excellent growth substrate for the microbes should any be present in the water used in the bottling.

In order to rid the source water of the undesirable salts, particles and carbonates, one known method employs a first-step mixing procedure wherein source water is added to an open vat containing a mixture of calcium hydroxide, iron sulfate, lime and chlorine (sodium hypochlorite). The entire mixture is then stirred and allowed to settle. The calcium hydroxide, iron sulfate and lime serve to precipitate carbonate and bicarbonate ions as calcium salts, which settle to the bottom of the vat. The treated water is then siphoned off the top of the settled debris, which includes a mixture of calcium carbonate, calcium sulfate, iron oxide and lime. This debris must be disposed of. Typically, this sediment is disposed of down commercial drains for lack of alternate disposal systems. This disposal procedure is cumbersome and given the large quantities of water so treated, may create problems in subsequent municipal sewage treatment plants.

The foregoing procedure, also, fails to remove any of the sodium typically present in water supplies at about 200 parts per million. This first-stage mixing procedure may even result in an increased sodium content since sodium hypochlorite is typically added. Such a high sodium content makes this water unsuitable for individuals on sodium-restricted diets and may alter the taste of soft drinks prepared with this water.

Additionally, the use of an open vat which is highly susceptible to airborne microbial contamination necessitates the addition of large amounts, such as 15-20 parts per million of chlorine to insure sterility of the treated water. The added chlorine must then be moved as its presence would greatly interfere with the taste of the water so treated. It is undesirable to manufacture soft drinks from chlorine-containing water because the taste, color, and quality are adversely affected. The presence of even low concentrations of chlorine could make it impossible to achieve a soft drink product meeting quality standards. Present methods for removing the chlorine added in the first treatment step involve passing the first treated water through large closed tanks containing particles of sterile carbon.

This carbon treatment step currently employed is also undesirable as the activated carbon particles must be backflushed daily with treated water to remove residues, for example calcium carbonate, that coat and inactivate carbon. The backflushing process breaks down the carbon particles resulting in the necessity for carbon replacement at least once per year or more as needed. The entire tank, and its contents of carbon, sand and gravel must be sterilized regularly, at least once per week (or more depending on bacterial count) and the contents replaced periodically and additionally sterilized. Sterilization of the carbon particles is achieved by hot steam requiring an additional apparatus capable of flushing the carbon tanks with high pressure steam. Removal of the carbon from these tanks is a cumbersome, time-consuming, labor-intensive process and further necessitates the shut-down of the entire treatment process, sometimes for several days. As a result, water treatment rooms are often hot, unairconditionable, dusty, environments with occasional carbon black water-laden floors. It is difficult to keep such an environment sanitary. Additionally, since persons and objects are carriers of microbes, the introduction of large amounts of carbon, sand and gravel and high labor requirements of the burdensome process outlined above causes the introduction of numerous microorganisms to the tanks, equipment and the treatment room.

The requirement that large amounts of chlorine be employed also increases production costs in several ways. First a large capital investment in high-volume chlorine removal equipment is necessitated. Second, labor costs are greatly increased due to the extensive maintenance requirements of the necessary equipment and the labor-intensive sterilization procedure. Third, expenditures are increased for chlorine as the amount used is increased. Production costs are also increased due to chemicals used in the precipitation procedure, as they are both costly and expensive to store.

It was, therefore, desirable to develop a water treatment process which could remove the salts, iron, carbonates, sodium, particles, and any other undesirable materials from source water supplies, which treatment would not require the use of large quantities of sterile carbon to remove the high concentrations of chlorine which had to be added to water in prior methods. A need existed to develop a method for economically sterilizing large quantities of water, and delivering it sterile and chlorine-free to its end use. Finally, it was desirable to devise a method which would allow sanitary water treatment facilities to exist, to minimize the microbial contamination that would be brought into the plant, to reduce labor requirements, to eliminate shut-down time and undesirable treatment room conditions, and to develop a more economical process.

SUMMARY OF THE INVENTION

In accordance with the present invention, a process for obtaining essentially sodium-free, sterile water, suitable for bottling or other purposes, from municipal or ground water ("source water") is provided. More specifically, this invention relates to a process for obtaining sterile water for use in bottling commercial beverages and drinking water.

It has now been found that an economical, large-scale purification process can be achieved which avoids the expense of distillation, which effectively removes carbonates, sodium, and other contaminants from source water, and which does not require adding large quantities of chlorine to insure sterility. The disclosed method yields low-sodium, low-particulate, virtually chlorine-free, sterile water from source water. The characteristics of source water obtainable at any given time or location may vary, however the components of this purification method are adaptable to achieve the desired purification.

A reverse osmosis system is utilized in this method to remove total dissolved solids (including sodium) and microorganisms from the water. Total dissolved solids are reduced to about 5 to 15 ppm. The reverse osmosis procedure makes it possible to produce water with low sodium and low alkalinity. Additionally, reverse osmosis removes microorganisms.

Depending on the characteristics of source water available, it is often desirable to pre-treat the source water before the reverse osmosis step. Components of commercially available reverse osmosis systems will last longer if pre-treatment is employed. It has been found that a series of ion-exchange, particulate filtration, and ultrafiltration steps provide effective pre-treatment before the reverse osmosis step. If source water is chlorinated, it is most effective to employ a carbon filtration means capable of removing chlorine that may have been added in municipal treatment, for example. Chlorination of water would reduce the life of reverse osmosis permeators. A chilling procedure is necessary if source water exceeds 95° F. Heat-destruction of presently available commercial filters may otherwise occur.

Because it is undesirable to assess the characteristics of source water and re-adapt procedures to meet the changing purification requirements, a system has now been designed to provide a continuous process for the purification of typical source water. Therefore, a chilling means, an ion-exchange apparatus, particulate filtration means, ultrafiltration means and chlorine-removal means have been linked to provide a continous pre-treatment of source water that will undergo reverse osmosis. A commercially available reverse osmosis system is linked with the pre-treatment apparatuses. A continuous flow of pre-treated source water is provided to the reverse osmosis apparatus. After passing through the reverse osmosis step, the purified water may be used immediately or stored.

Another aspect of the present invention relates to the storage of purified water. In large scale operations, it is often necessary to store purified water for several days before it is used in production. Adding chlorine is an inexpensive way to check microbial growth during storage. However, no chlorine is desired in water used in many food and beverage applications. If water is stored in an open vat, large quantities of chlorine of about 20 parts per million ("ppm") or more would be required to effectively suppress microbial contamination. It has now been found that a closed holding tank, which has little exposure to the atmosphere can be used for the storage of purified water and that the amount of chlorine added can then be reduced to as little as 1–3 ppm of chlorine. The necessity of cumbersome chlorine removal procedures for which it is difficult to insure sterility can now be obviated by employing newly-designed, autoclavable activated carbon-containing tank(s). Purified water can now be economically sterilized with chlorine, stored as desired, and can be separated from that chlorine under sterile conditions to result in a purified, sterile water suitable for a variety of uses. A major problem in the beverage industry of storing large volumes of water without microbial contamination is thus solved by the present invention.

The storage step just described can be used as part of a continuous purification process suitable for the food and beverage industry. For example, it can be employed after the reverse osmosis step described in the first aspect of this invention. Additionally, it might be employed in conjunction with any water purification process where it is desired to economically sterilize substantially purified water with chlorine, yet where chlorine-free, sterile water is needed for end use.

Another aspect of this invention relates to autoclavable, carbon particle-containing tanks comprising a receptacle for carbon particles, the receptacle being manufactured from material capable of withstanding at least 250° F. which is also impervious to airborne microorganisms, and activated carbon particles effective for removing chlorine from water. A parallel bank of such autoclavable tanks may be employed to achieve high-volume chlorine removal under sterile conditions.

DETAILED DESCRIPTION OF THE INVENTION

Water, obtained directly from a municipal source or well, ("source water") is not suitable for the manufacture of beverages such as soft drinks.

A non-distillation method for suitably purifying source water, which can be economically employed, involves a series of steps which partially purify water from such contaminants as hard water cations (such as magnesium and calcium), particles exceeding about 20 microns in diameter, organic chemicals, municipally added chlorine, and others.

Most commercial filters cannot tolerate water temperatures exceeding 95° F. A pre-chilling step is therefore employed to reduce the temperature to about 75–95° F., and preferably to about 80° F. Any suitable system capable of cooling the amount of water to be processed would be satisfactory for this part of the method. A variety of commercial water chillers is available. In one aspect of this invention, a water chiller capable of cooling about 16–40 gallons of water per minute from about 95° F.–115° F. to about 75°–95° F. is employed.

After chilling, the hard water cations are removed via an ion-exchange means. In this step, sodium ions are exchanged for hard water ions such as, for example, calcium and magnesium. Any suitable, high-volume ion-exchange apparatus such as are well known to those skilled in the art is suitable for this step. One suitable apparatus is available from Continental Water Systems, Model FR 150 manufactured by Sta Rite.

It is desirable to remove any chlorine that may have been present in source water. A suitable filtration means to achieve this objective is a carbon filter. One type of carbon filter suitable is the Continental Ion Exchanger Tank (Model FR 150) filled with activated carbon.

Particulate material may be present in the original source water. Carbon fines may be introduced via the previous chlorine-removal step. It is desirable to remove these materials to prevent clogging and/or lengthen the life of components in the subsequent processes. A filtration means excluding particles larger than about 25 microns is suitable. It is preferable to use a 20 micron filter as it eliminates most undesired particles while allowing a flow rate that will not substantially slow the process. An example of an appropriate filter is Item #22, made by Water Equipment Technologies, West Palm Beach, Fla. 33407.

An ultrafiltration means is next employed. Commercially available ultrafiltration systems that remove most particles, colloids, microorganisms, and pyrogens are suitable. The approximate pore size of a suitable ultrafiltration means is about 1 to 5 micrometer. An example of suitable ultrafiltration system is that available from Continental Water Conditioning Corporation, Model 8031, 1220 Lumpkin Rd., Houston, Tex. 77043.

The preceding steps are employed to provide semi-purified water stock for the ensuing reverse osmosis process. It is evident that not all steps may be necessary if the original source water does not contain undesirable contaminants which the steps are designed to eliminate. Reverse osmosis of the water pre-treated as detailed above is capable of removing 90%-95% of dissolved solids, microorganisms, minerals, organic colloids and silica that may remain even after the above treatment steps. About 99% of bacterial particles, organics, and pyrogens over 300 in molecular weight are removable. A commercially available reverse osmosis device which has a capacity equal to or above the plant demand, and is capable of removing total dissolved solids that exceed about 5-15 ppm, would be suitable for this step of the procedure.

An example of a suitable reverse osmosis device is available from the Continental Water Conditioning Corporation, Model No. 3035. A reverse osmosis device with more permeators could handle more gallons per day, and it would be obvious to one skilled in the art to increase capacity by so modifying the reverse osmosis step.

The invention includes steps subsequent to reverse osmosis which insure the sterility of water used in bottling or other procedures. Although reverse osmosis removes most, if not all, of microorganisms contained in the water, it may be necessary to hold this substantially purified water for an indefinite period of time, but usually not exceeding 72 hours, before it is used in other procedures. The invention employs a new holding system, in which purified water is caused to flow into tanks. It is then chlorinated with at least 1 ppm (parts per million) chlorine, in the form of sodium hypochlorite, but not more than about 10 ppm chlorine. Preferably, the chlorine is added at a level of 2-3 ppm. A preferred means of insuring uniform chlorination is an automatic injection pump and recirculation means. The holding tanks must be substantially closed to prevent airborne microbial contamination. All airvents should be covered with a filter capable of excluding most or all microorganisms. A suitable holding tank is made from fiberglass.

When the water is ready for use, it is desirable for the manufacture of certain human consumables to eliminate the chlorine previously added. In particular, soft drinks require nearly chlorine-free water so that the flavor is appropriate. It has now been found that the sterility of the water can be maintained by passing the water through at least one sterile, autoclavable, tank having a receptacle which holds activated carbon particles capable of absorbing chlorine from the water. Such tanks must be impervious to microbial contamination when properly attached to the system, and the receptacles fabricated from a material capable of withstanding 250° F. They must be of a size which can fit into an autoclave. Stainless steel is a preferred material for the receptacles.

The autoclavable tanks also contain activated carbon which is sterilized while within the receptacle during the autoclaving process. A quantity of carbon effective to remove chlorine added in the treatment process is required. In a preferred embodiment, 2-3 ppm of chlorine are removed from about 9000 gallons of substantially purified water by passing the water through a parallel bank of four autoclavable tanks simultaneously, such that each tank processes about one-fourth the total water, each tank having an inlet means delivering water from previous treatment steps, and an outlet means, the outlet means comprising a dip tube, a mesh strainer and a connector connecting to further treatment steps or an end use. The inlet connector and the outlet connector diameters are selected to be large enough to produce the flow rate desired for the particular system. The dip tube is usually a hollow cylindrical pipe connectable to the outlet connection means. The dip tube must be made of autoclavable material which will not introduce undesirable contaminants into the water. One appropriate material is, for example, stainless steel. The diameter of the dip tube is preferably about equal to the diameter of the connector. It is preferred that a sterile filter capable of excluding particles larger than about 5 microns be employed following the chlorine-removal in the autoclavable tank(s) to remove carbon fines that may have been introduced. This filtration may be necessary for some end uses.

BRIEF DESCRIPTION OF THE DRAWINGS

The description that follows should be read in conjunction with the accompanying drawings in which:

FIG. 1 is a schematic diagram of one embodiment of the water purification process herein described.

FIG. 2 is a partially cut-away top and side view of an autoclavable activated carbon-containing filtration device. In FIG. 1, throttling valve 20 regulates the flow of a pre-chilled water supply into pipe 22 which connects to ion-exchange means 24. Water then flows through pipe 26 to carbon filtration means 28 wherein chlorine is removed. Throttling valve 32 regulates the flow from filtration means 28 through pipe 30. Pressure regulator means 34 and pressure gauge 36 insure proper pressure to twenty micron filter 38. Water then flows through pipe 40 to which low pressure switch 42, motor-operated ball valve 44, pressure gauge 46 are sequentially attached, through pipe 48 and high pressure switch 50 to either pipe 54 or through motor-operated ball valve 52 to backwash waste to drain 55. Water flowing through pipe 54 enters ultrafiltration device 56 where it undergoes further removal of contaminants. Water then flows through pipe 57, which is monitored by pressure gauge 58, passing through Y-check valve 60. Sampling port 62 allows for testing of water quality at this point, if desired. 64 denotes a flow indicator and flow element. Low pressure switch 68 regulates water pressure to feed pump 70. A pump discharge pressure gauge is interspersed between throttling valve 74 and permeator feed pressure gauge 76. 78 indicates a back pressure valve. Water then is made to flow through reverse osmosis permeators 80. Throttling valve 82 is placed to regulate flow. Reject pressure gauge 84, reject flow control valve 86 and reject flow meter 88 monitor the water rejected to drain waste. Purified water flow is monitored by permeator flow meter 90 and water quality meter 92. Water then flows through pipe 94 to which sampling port 86, is connected. Ball check valve 98 is placed between sampling port 96 and throttling valve 100. Water then flows into 4500 gallon storage tanks 102 or 104. Chlorine drum 106 is used to store chlorine to be introduced via chemical injection pump 108 into the tanks 102 or 104. Recirculating pump 110 keeps the chlorine uniform throughout the stored water in tanks 102 and 104. Throttling valves 112 and 114 regulate the flow of water into line 116. Water flows through line 116 and is equalized through 118 or 128 throttling valves, pumped by 120 or 126 repressurization pumps, then through 122 or 124 throttling valves. The water then flows through pressure equalizer 130. The water may then be directed through autoclavable chlorine-removal tanks, 148, 150, 152 or 154, or a bypass. Flow through the bypass is controlled by throttling valves 132 and 137. With valves 132 and 137 opened, and throttling valves 140, 142, 144, and 146 closed, water passes through impulse meter 134 which sends an impulse to injection pump 136 after about one liter of water has passed through. Injection pump 136 then causes chlorine from chlorine drum 106 to flow through line 135 through line 158 and continuing to 172 (all points of use).

140, 142, 144, and 146 are throttling valves for regulating water flow into autoclavable tanks 148, 150, 152, and 154. 156 is a pressure gauge. With valves 132 and 137 closed, and valves 140, 142, 144 and 146 open, water flows through an inlet of one autoclavable tank 148, 150, 152 or 154, filters through sterile carbon particles contained within, and out of the bottom through dip tube 139, 141, 143 or 145, through a mesh strainer and out through an outlet connector into line 158 after passing through throttling valve 149, 151, 153, or 155. Line 158 connects to throttling valve 160, then connects to pressure gauge 162, then to 5 micron filter 164. Pressure gauge 166 is then placed on the line followed by sampling port 168 and throttling valve 170, after which the water passes to use 172. Chlorine-free, sterile water flowing from tanks 148, 150, 152 or 154 may be used to flush points subsequent to throttling valves 149, 151, 153 or 155 to remove any residual chlorine in those pipes or equipment, and this flush water discarded until and appropriate chlorine test reads negative. A preferred chlorine test employs orthotolidine in a colorimetric assay, but any analytical chlorine detection method may be used.

FIG. 2 is an enlargement of tank 148, 150, 152, or 154 of FIG. 1. 300 is a receptacle made of autoclavable material which is also impervious to microorganisms. 302 is an inlet valve and 304 is an outlet valve. 306 are sterile, activated carbon particles contained within the receptacle. The water is filtered down through carbon particles 306 after entering the tank through inlet valve 302. Inside receptacle 300, the water is picked up by dip tube 303 which extends to about 1-3 inches from the bottom of receptacle 300 and passes through receptacle 300, then fine mesh strainer 305 which removes carbon particles greater than about 5 mesh, finally exiting through outlet valve 304.

We claim:
1. A method for purifying source water comprising:
 a. passing said water through an ion-exchange means suitable to remove hard water cations;
 b. causing said water to pass through a first filtration means capable of removing chlorine from said water;
 c. passing said water through a second filtration means capable of removing particulates greater than about 20 microns in diameter;
 d. passing said water through an ultrafitration means;
 e. subjecting said water to reverse osmosis;
 f. adding chlorine to said water in an effective amount to suppress microbes;
 g. removing the chlorine added in step f by passing said water through a quantity of sterile carbon particles effective to remove said chlorine, said carbon particles contained in a receptacle of at least one sterile, autoclavable tank.

2. The method of claim 1, wherein the initial temperature of said source water is greater than 95° F., further comprising an initial pre-chilling step wherein said source water is chilled to a temperature of about 75° F. to about 95° F.

3. The method of claim 2, wherein said source water is pre-chilled to about 80° F.

4. The method of claim 1, wherein the amount of chlorine added is from about 1 ppm to about 10 ppm.

5. The method of claim 4, wherein the amount of chlorine added is from about 2 to about 3 ppm.

6. The method of claim 5, wherein said water is passed through a parallel bank of four of said sterile, autoclavable tanks.

7. The method of claim 6, wherein each autoclavable tank has a capacity of about 0.9 cubic feet.

8. The method of claim 7, wherein each autoclavable tank is cylindrical and about 8 inches in diameter and about 30 inches in height.

9. The method of claim 1, wherein said water is passed through a parallel bank of four of said sterile autoclavable tanks.

10. The method of claim 9, wherein each autoclavable tank has a capacity of about 0.9 cubic feet.

11. The method of claim 10, wherein each autoclavable tank is cylindrical and about 8 inches in diameter and about 30 inches in height.

12. A method for storing substantially purified water comprising:
 a. causing said substantially purified water to pass into a substantially closed holding tank;
 b. adding an amount of chlorine to said holding tank effective to kill any microbes present;
 c. causing said chlorine to be continually uniformly distributed throughout said holding tank;
 d. thereafter pumping said water through a quantity of sterile, carbon particles effective to remove said chlorine, said carbon particles being contained in at least one sterile autoclavable closed tank.

13. The method of claim 12 in which said water is passed through a parallel bank of four of said autoclavable tanks.

14. The method of claim 13 in which each autoclavable tank has a capacity of about 0.9 cubic feet.

15. The method of claim 14 wherein each autoclavable tank is cylindrical and about 8 inches in diameter and about 30 inches in height.

16. The method of claim 12 in which the chlorine concentration is about 1-10 ppm.

17. The method of claim 16 in which the chlorine concentration is about 2-3 ppm.

* * * * *

UNITED STATES PATENT AND TRADEMARK OFFICE
CERTIFICATE OF CORRECTION

PATENT NO. : 4,724,079
DATED : February 9, 1988
INVENTOR(S) : Gloria S. Sale, et al.

It is certified that error appears in the above—identified patent and that said Letters Patent is hereby corrected as shown below:

Column 2, line 1           "moved" should be --removed--.

Column 5, line 20          before "suitable" insert --a--.

Column 7, line 11          "86," should be --96--.

Signed and Sealed this

Fourteenth Day of June, 1988

Attest:

DONALD J. QUIGG

Attesting Officer      Commissioner of Patents and Trademarks